United States Patent [19]
Komatsu et al.

[11] Patent Number: 4,960,823
[45] Date of Patent: Oct. 2, 1990

[54] RESIN COMPOSITION FOR BUMPERS

[75] Inventors: Masato Komatsu, Hanno; Masaaki Isoi, Saitama; Isao Baba, Yokohama; Takashi Mikami, Komae, all of Japan

[73] Assignee: Tonen Sekiyukagaku Kabushiki Kaisha, Tokyo, Japan

[21] Appl. No.: 479,020

[22] Filed: Feb. 12, 1990

[30] Foreign Application Priority Data

Feb. 13, 1989 [JP] Japan .................................. 1-33211

[51] Int. Cl.$^5$ ..................... C08L 53/00; C08L 23/16; C08L 23/06
[52] U.S. Cl. .......................................... 525/89; 525/88
[58] Field of Search .......................................... 525/89

[56] References Cited

U.S. PATENT DOCUMENTS 3,478,128 11/1969 Hagemeyer et al. ................ 260/876
4,740,543 4/1988 Matsumo et al. ..................... 525/78

FOREIGN PATENT DOCUMENTS 7207141  2/1972 Japan ................... 525/89
57-55952  4/1982 Japan .
60-184547 9/1985 Japan ................... 525/89
61-36346  2/1986 Japan .
61-215643 9/1986 Japan .
61-254649 11/1986 Japan .
62-15253  1/1987 Japan .
62-277459 12/1987 Japan ................... 525/89
63-122752 5/1988 Japan .
63-152658 6/1988 Japan .
63-172758 7/1988 Japan .
63-186754 8/1988 Japan ................... 525/99

Primary Examiner—Carman J. Seccuro
Attorney, Agent, or Firm—Armstrong, Nikaido, Marmelstein, Kubovcik & Murray

[57] ABSTRACT

A resin composition for bumpers including:
(a) 50–65 parts by weight of a propylene-ethylene block copolymer including:
 (i) 60–75 weight % of a propylene-ethylene block copolymer having an ethylene content of 4–20 weight % and a melt flow rate of 9–30 g/10 min (230° C., 2.16 kg load), and
 (ii) 40–25 weight % of a propylene-ethylene block copolymer having an ethylene content of 4–20 weight % and a melt flow rate of 40–80 g/10 min (230° C., 2.16 kg load);
(b) 40–25 parts by weight of an ethylene-propylene copolymer rubber and/or an ethylene-propylene-diene terpolymer rubber each having an ethylene content of 50–80 weight % and a Mooney viscosity $ML_{1+4}$ (100° C.) of 80 or less; and
(c) 10–15 parts by weight of high-density polyethylene having a melt index of 1–20 g/10 min (190° C., 2.16 kg load), (a)+(b)+(c) being 100 parts by weight.

1 Claim, No Drawings

RESIN COMPOSITION FOR BUMPERS

BACKGROUND OF THE INVENTION

The present invention relates to a resin composition for bumpers, and more particularly to a resin composition for bumpers showing excellent impact resistance, moldability and surface gloss.

Recently, bumpers for automobiles are increasingly required to be light and have excellent impact resistance, paintability, etc. and also have good surface appearance. Particularly, under the 5-mile regulations in the U.S., bumpers are required to be undamaged by impact corresponding to 5 mph, and also to be resistant to deterioration such as whitening, etc.

Bumpers are conventionally made of polyurethanes, polycarbonates, engineering plastic alloys, etc. However, these materials tend to be whitened by impact and are vulnerable to marring. In addition, they are expensive and are likely to suffer from large amounts of molding losses, resulting in poor productivity. Accordingly, alternative materials have been needed.

As resin compositions for bumpers having excellent impact resistance, moldability, surface appearance, etc., various compositions comprising ethylene-propylene block copolymers and ethylene-propylene copolymer rubbers and/or ethylene-propylene-diene terpolymer rubbers, and fillers such as talc, etc. were proposed (Japanese Patent Laid-Open Nos. 57-55952, 61-36346, 61-215643, 61-254649, 63-122752, 61-152658 and 63-172758). However, these resin compositions for bumpers are not necessarily satisfactory in moldability, because they are likely to have flow marks, and the addition of fillers results in poor surface appearance of their molded products.

Thus, an attempt was proposed to provide a resin composition for bumpers comprising a propylene-ethylene block copolymer, an ethylene-propylene copolymer rubber and a styrene-hydrogenated butadiene-styrene block copolymer rubber (SEBS), which has been partially put to practical use (Japanese Patent Laid-Open No. 62-15253).

However, this bumper material is not only poor in resistance to surface damage in spite of good surface gloss, but also has a nature of absorbing a large amount of trichloroethane. Accordingly, the trichloroethane used for painting remains in the rubber component in a large amount, and is evaporated in the subsequent baking process. Accordingly, the resulting coating surface is likely to have pin holes, providing the resulting bumpers with poor surface appearance.

As described above, the conventional bumper compositions are not necessarily satisfactory in impact resistance, mar resistance, moldability, surface gloss, solvent absorption, etc.

OBJECT AND SUMMARY OF THE INVENTION

An object of the present invention is, accordingly, to provide a resin composition for bumpers having good properties such as impact resistance, moldability, surface gloss, paintability, etc.

As a result of intense research in view of the above object, the resin composition having excellent impact resistance, moldability, solvent resistance, surface gloss, surface appearance, etc. can be obtained by mixing two propylene-ethylene block copolymers having different melt flow rates, an ethylene-propylene copolymer rubber and/or an ethylene-propylene-diene terpolymer rubber and a high-density polyethylene in particular proportions. The present invention is based upon this finding.

Thus, the resin composition for bumpers according to the present invention comprises:
  (a) 50–65 parts by weight of a propylene-ethylene block copolymer comprising:
    (i) 60–75 weight % of a propylene-ethylene block copolymer having an ethylene content of 4–20 weight % and a melt flow rate of 9–30 g/10 min (230° C., 2.16 kg load), and
    (ii) 40–25 weight % of a propylene-ethylene block copolymer having an ethylene content of 4–20 weight % and a melt flow rate of 40–80 g/10 min (230° C, 2.16 kg load):
  (b) 40–25 parts by weight of an ethylene-propylene copolymer rubber and/or an ethylene-propylene-diene terpolymer rubber each having an ethylene content of 50–80 weight % and a Mooney viscosity $ML_{1+4}$ (100° C.) of 80 or less: and
  (c) 10–15 parts by weight of high-density polyethylene having a melt index of 1–20 g/10 min (190° C., 2.16 kg load), (a)+(b)+(c) being 100 parts by weight.

DETAILED DESCRIPTION OF THE INVENTION

The propylene-ethylene block copolymer component (a) used in the present invention comprises (i) 60–75 weight % of a propylene-ethylene block copolymer having an ethylene content of 4–20 weight % and a melt flow rate of 9–30 g/10 min (230° C, 2.16 kg load), and (ii) 40–25 weight % of a propylene-ethylene block copolymer having an ethylene content of 4–20 weight % and a melt flow rate of 40–80 g/10 min (230° C, 2.16 kg load).

Each propylene-ethylene block copolymer is produced by first polymerizing propylene to provide a polypropylene moiety, and then supplying ethylene to copolymerize it with the polypropylene moiety, and repeating this operation two or more times. In these block copolymers, the ethylene content is 4–20 weight %. When the ethylene content is lower than 4 weight %, the resin composition has poor impact resistance. On the other hand, when the ethylene content exceeds 20 weight %, the resin composition has insufficient mechanical properties such as flexural modulus, etc. The preferred ethylene content is 5–15 weight %.

When these propylene-ethylene block copolymers have small MFR, flow marks are likely to appear in the process of molding the composition, resulting in poor surface appearance. On the other hand, when the MFR is too large, the resin composition has decreased impact resistance. To avoid these problems, a propylene-ethylene block copolymer having a small MFR and a propylene-ethylene block copolymer having a large MFR should be combined in the present invention. In this case, the propylene-ethylene block copolymer (i) having a small MFR has an MFR of 9–30 g/10 min (230° C, 2.16 kg load), preferably 10–20 g/10 min, and the propylene-ethylene block copolymer (ii) having a large MFR has an MFR of 40–80 g/10 min, preferably 50–70 g/10 min.

The proportions of the propylene-ethylene block copolymers (i) and (ii) are 60–75 weight % of (i) and 40–25 weight % of (ii). Preferably, (i) is 65–70 weight %, and (ii) is 35–30 weight %. When the content of (ii)

is smaller than 25 weight %, the resin composition shows poor flowability in the process of molding, making it likely that the resulting molded products have large numbers of flow marks, showing poor surface appearance. On the other hand, when (ii) exceeds 40 weight %, the resin composition has insufficient mechanical properties.

Incidentally, as long as each propylene-ethylene block copolymer has an MFR within the above range, not only two propylene-ethylene block copolymers but also three or more propylene-ethylene block copolymers can be combined within the proportions as defined above.

The amount of propylene-ethylene block copolymer component (a) is 50–65 parts by weight, particularly 55–60 parts by weight, based on the total weight of the resin composition (100 parts by weight), in order to have flexural modulus of 5500 kgf/cm2 or less, so that the resin composition has good softness. When the amount of the propylene-ethylene block copolymer component (a) is lower than 50 parts by weight, the resin composition has insufficient mechanical strength, and when it is larger than 65 parts by weight, the resin composition has decreased impact resistance and loses high-grade appearance (good softness).

The rubber component (b) used in the present invention serves to increase impact resistance. It comprises an ethylene-propylene copolymer rubber (EPR) having an ethylene content of 50–80 weight % and a Mooney viscosity $ML_{1+4}$ (100° C.) of 80 or less, and/or an ethylene-propylene-diene terpolymer rubber (EPDM) having the same ethylene content and the Mooney viscosity $ML_{1+4}$ (100° C.) as above.

When the ethylene content in each of the rubbers is less than 50 weight %, the resin composition has decreased impact resistance, and when it exceeds 80 weight %, the resin composition has decreased thermal deformation resistance. The preferred ethylene content is 65–80 weight %.

Further, when these rubbers have a Mooney viscosity $ML_{1+4}$ (100° C.) exceeding 80. the resin composition has decreased moldability. The preferred Mooney viscosity $ML_{1+4}$ (100° C.) is 10–40.

When EPDM is used as the rubber component (b), the diene content in EPDM is preferably 2–5 weight %.

The amount of the ethylene-propylene copolymer rubber (EPR) and/or the ethylene-propylene-diene terpolymer rubber (EPDM) in the resin composition of the present invention is 25–40 parts by weight based on the total weight of the resin composition (100 parts by weight). When the amount of EPR and/or EPDM is lower than 25 parts by weight, the resin composition has insufficient impact resistance. On the other hand, when it exceeds 40 parts by weight, the resin composition has poor surface appearance and solvent resistance.

In the present invention, high-density polyethylene having a melt index (MI) (190° C., 2.16 kg load) of 1–20 g/10 min is used as an indispensable component. The high-density polyethylene serves to increase the moldability and decrease the amount of a solvent absorbed.

When the MI of the high-density polyethylene is smaller than 1 g/10 min, the resin composition has poor moldability, so that it is likely to have flow marks. On the other hand, when the MI is larger than 20 g/10 min, the resin composition has decreased impact resistance at a low temperature. Accordingly, the MI range of the high-density polyethylene is 1–20 g/10 min. The preferred MI range is 5–10 g/10 min.

The amount of the high-density polyethylene of the present invention is 10–15 parts by weight based on the total weight of the resin composition (100 parts by weight). When the amount of the high-density polyethylene is smaller than 10 parts by weight, the resin composition has poor impact resistance and large solvent absorption. On the other hand, when it exceeds 15 parts by weight, the resulting molded products have poor surface appearance.

The resin composition of the present invention may further contain pigments such as carbon black, etc., additives such as those for increasing weathering resistance, etc. in addition to the above indispensable components, but other fillers such as talc should not be added to maintain its good surface gloss and appearance.

The resin composition of the present invention preferably has an MFR of 7 g/10 min or more to prevent the formation of flow marks in the process of molding. The particularly preferred MI of the resin composition is 10 g/10 min or more. In addition, as impact resistance characteristic for meeting the 5-mile regulations in the U.S., the resin composition preferably has an Izod impact strength ($-30°$ C.) of 10 kgf.cm/cm or more, particularly 20 kgf.cm/cm or more.

The resin composition for bumpers according to the present invention may be produced by mixing the above-mentioned components, and subjecting them to a dynamic heat treatment, namely melt blending. Melt blending apparatuses include open-type mixing rolls, closed-type Banbury mixers, extruders (including double-screw extruders), kneaders, continuous mixers, etc. The blending may be conducted at a temperature of 170°–250° C., preferably 190°–220° C. for 0.2–1 minute, preferably 0.3–0.5 minute.

The resin composition of the present invention may be molded by an apparatus usually used for the molding of the thermoplastic resins, and it is particularly suitable for injection molding.

By meeting the above requirements, the molded products have such flexural modulus as to provide the bumpers with high-grade appearance (softness) while maintaining sufficient mechanical properties, and further have excellent properties necessary as bumper materials, namely excellent impact resistance, mar resistance, paintability, moldability, surface gloss, surface appearance, etc.

As described above, the resin composition for bumpers according to the present invention contain two or more propylene-ethylene block copolymers having different MFRs as a propylene-ethylene block copolymer component having excellent rigidity and thermal deformation resistance to improve both mechanical strength and moldability (prevention of flow marks). In addition, by adding an ethylene-propylene copolymer rubber and/or an ethylene-propylene-diene terpolymer rubber as a rubber component, the resin composition has improved impact resistance and further has improved resistance to whitening and surface appearance by fine, uniform dispersion of the rubber component in the resin composition.

In addition, since the high-density polyethylene is added, the moldability is increased while preventing the deterioration of surface gloss and the formation of flow marks. The addition of the high-density polyethylene further serves to lower the absorption of a solvent such as trichloroethane, etc.

Since each component having the above properties is combined in proper proportions, all the properties required for bumpers are owned by the resin composition.

The present invention will be explained in further detail by means of the following Examples.

EXAMPLES 1–7

Resin components were blended in proportions as shown in Table 1, and blended by a double-screw extruder at 200° C. for 0.5 minute to provide resin composition pellets. The resulting resin composition was formed into test pieces to conduct the following measurements.

The starting resin components and the measurement methods were as follows:

[1] Resins

PP (1): Propylene-ethylene block copolymer ("BJ-315" manufactured by Tonen Sekiyukagaku K. K., molecular weight: 160,000, ethylene content: 7 weight %, MFR: 15 g/10 min).

PP (2): Propylene-ethylene block copolymer ("BJ-370" manufactured by Tonen Sekiyukagaku K. K., molecular weight: 100,000, ethylene content: 7 weight %, MFR: 70 g/10 min).

PP (3): Propylene-ethylene block copolymer ("BJ-309" manufactured by Tonen Sekiyukagaku K. K., molecular weight: 200,000, ethylene content: 7 weight %. MFR: 9 g/10 min).

EPR: Ethylene-propylene copolymer rubber ("EP-02P" manufactured by Japan Synthetic Rubber Co., Ltd., propylene content: 26 weight %, Mooney viscosity $ML_{1+4}$ (100° C.): 24).

EPDM: Ethylene-propylene-diene terpolymer rubber ("EP-51" manufactured by Japan Synthetic Rubber Co., Ltd., ethylene content: 72 weight %, propylene content: 26 weight %, Mooney viscosity $ML_{1+4}$ (100° C.): 38).

HDPE(1):High-density polyethylene ("J-6140" manufactured by Tonen Sekiyukagaku K. K., melt index (MI): 5 g/10 min, density: 0.958 g/cm3).

HDPE (2): High-density polyethylene ("J-6170" manufactured by Tonen Sekiyukagaku K. K., MI: 7 g/10 min, density: 0.958 g/cm$^3$).

[2] Measurement method (1) MFR and MI

Measured according to a method of measuring the flow of thermoplastics (JIS K7210).

(2) Tensile strength and tensile elongation

Measured according to a tensile test method of plastics (JIS K7113) by using a 1 dumbbell at a tensile speed of 50 mm/minute.

(3) Flexural modulus

Measured according to a bending test method of hard plastics (JIS K7203) at a bending speed of 10 mm/minute.

(4) Izod impact strength

Measured according to an impact strength test of hard plastics (JIS K7110) at −30° C.

(5) Thermal deformation temperature

Measured according to a method of measuring a deflection temperature of hard plastics (JIS K7207) at a load of 4.6 kgf/cm$^2$.

(6) Thermal sagging

Measured by fastening an upper end of 3-mm-thick test piece to a measuring equipment, keeping it in a hot water bath at 100° C. for 1 hour to measure the distance of sagging. Incidentally, the distance between the fastened point and the bottom end of the test piece was 100 mm.

(7) Solvent absorption

After each test piece of 3 mm × 70 mm × 120 mm was kept in a trichloroethane vapor for 60 seconds, it was left to stand at room temperature for 1 hour, and then the amount of the remaining trichloroethane was measured. Solvent absorption was expressed by weight % based on the weight of the test piece before test.

(8) Linear expansion coefficient

Measured by a TMA-100 apparatus manufactured by Seiko Denshi K. K. in a temperature range of −30° C. to +80° C.

(9) Paintability

Each molded product was kept in a trichloroethane vapor, and coated with "RB-291" manufactured by Japan B. Chemical as a primer, and then with "R-271" manufactured by Japan B. Chemical as an upper coat, according to a standard coating method. Each sample was measured with respect to adhesion between the resin substrate and the coating layer after a warm water resistance test (immersion in warm water at 40° C. for 240 hours). The evaluations were as follows:

=Good,

Δ+Partially peeled, and x=Peeled.

(10) Surface appearance

With respect to each test piece (3 mm × 100 mm × 350 mm) produced by injection molding, flow marks were observed. The evaluations were as follows:

=No flow marks,

Δ=Slight flow marks, and x=Extreme flow marks.

(11) Surface gloss

60° mirror surface gloss level was measured by a gloss tester.

The results of each measurement are shown in Table 1.

COMPARATIVE EXAMPLES 1 and 2

The same tests as in Examples were conducted on test pieces produced by mixing 100 weight % of the resin composition of Example 1 with 5 weight % of talc ("Mistron" manufactured by Nippon Mistron K. K., particle size: 1–3 μm)(Comparative Example 1), and on those mixed with 10 weight % of talc (Comparative Example 2). The results are shown in Table 2.

COMPARATIVE EXAMPLES 3–6

Propylene-ethylene block copolymers and ethylene-propylene copolymer rubbers were blended without adding high-density polyethylenes to produce resin compositions by the same method as in Examples. With respect to each test piece produced from the resin composition, the same measurements as in Examples were conducted. The results are shown in Table 2.

COMPARATIVE EXAMPLES 7 and 8

A resin composition having the same composition as in Example 1 was produced except for using 56 weight % of PP (1) only as a propylene-ethylene block copolymer component (a), and each test piece was produced (Comparative Example 7).

A resin composition having the same composition as in Example 1 was produced except for using 56 weight % of PP (2) only as a propylene-ethylene block copolymer component (a), and each test piece was produced (Comparative Example 8).

With respect to each test piece, the same measurements as in Examples were conducted. The results are shown in Table 2.

COMPARATIVE EXAMPLES 9 and 10

Resin compositions were produced according to the same method as in Examples except for using the proportions outside the range of the present invention. With respect to each of the resulting test pieces, the same measurements as in Examples were conducted. The results are shown in Table 2.

TABLE 1

|  | Example No. | | | | | | |
|---|---|---|---|---|---|---|---|
|  | 1 | 2 | 3 | 4 | 5 | 6 | 7 |
| COMPOSITION (weight %) | | | | | | | |
| PP(1) | 38 | 38 | — | 40 | 34 | 44 | 38 |
| PP(2) | 18 | 18 | 18 | 20 | 16 | 21 | 18 |
| PP(3) | — | — | 38 | — | — | — | — |
| EPR | 30 | 30 | 30 | 25 | 40 | 25 | — |
| EPDM | — | — | — | — | — | — | 30 |
| HDPE(1) | — | 14 | — | — | — | — | — |
| HDPE(2) | 14 | — | 14 | 15 | 10 | 10 | 14 |
| Talc | — | — | — | — | — | — | — |
| PROPERTIES | | | | | | | |
| MFR (g/10 min) | 10 | 12 | 7 | 11 | 10 | 13 | 11 |
| Tensile Strength (kgf/cm²) | 180 | 175 | 185 | 182 | 150 | 185 | 185 |
| Tensile Elongation (%) | 450 | 480 | 490 | 420 | 430 | 390 | 460 |
| Flexural Modulus (kgf/cm²) | 5400 | 5400 | 5200 | 5500 | 4800 | 7200 | 5500 |
| Izod Impact Strength (kgf · cm/cm) | 25 | 28 | 28 | 23 | 35 | 38 | 27 |
| Thermal Deformation Temperature (°C.) | 75 | 74 | 74 | 78 | 63 | 79 | 74 |
| Thermal Sagging (mm) | 2.0 | 2.2 | 3.1 | 2.1 | 4.5 | 1.8 | 2.0 |
| Solvent Absorption (weight %) | 0.60 | 0.58 | 0.62 | 0.51 | 0.78 | 0.61 | 0.58 |
| Linear Expansion Coefficient ($\times 10^{-5}$ cm/cm/°C.) | 7.0 | 7.1 | 7.1 | 7.4 | 6.8 | 7.2 | 7.0 |
| Paintability | O | O | O | O | O | O | O |
| Surface Appearance | O | O | O | O | O | O | O |
| Surface Gloss | 75 | 75 | 68 | 75 | 77 | 76 | 73 |

TABLE 2

|  | Comparative Example No. | | | | | | | | | |
|---|---|---|---|---|---|---|---|---|---|---|
|  | 1 | 2 | 3 | 4 | 5 | 6 | 7 | 8 | 9 | 10 |
| COMPOSITION (weight %) | | | | | | | | | | |
| PP(1) | 38 | 38 | 70 | 45 | 40 | 35 | 56 | — | 30 | 40 |
| PP(2) | 18 | 18 | — | 25 | 20 | 15 | — | 56 | 15 | 20 |
| PP(3) | — | — | — | — | — | — | — | — | — | — |
| EPR | 30 | 30 | 30 | 30 | 40 | 50 | 30 | 30 | 45 | 20 |
| EPDM | — | — | — | — | — | — | — | — | — | — |
| HDPE(1) | — | — | — | — | — | — | — | — | — | — |
| HDPE(2) | 14 | 14 | — | — | — | — | 14 | 14 | 10 | 20 |
| Talc* | 5 | 10 | — | — | — | — | — | — | — | — |
| PROPERTIES | | | | | | | | | | |
| MFR (g/10 min) | 8 | 7.5 | 8 | 13 | 10 | 6 | 7 | 18 | 7.0 | 12 |
| Tensile Strength (kgf/cm²) | 188 | 195 | 160 | 165 | 155 | 135 | 188 | 180 | 135 | 175 |
| Tensile Elongation (%) | 320 | 200 | 430 | 380 | 460 | 490 | 490 | 230 | 500 | 380 |
| Flexural Modulus (kgf/cm²) | 8200 | 8900 | 6100 | 6200 | 4900 | 3800 | 5200 | 5300 | 3800 | 6200 |
| Izod Impact Strength (kgf · cm/cm) | 18 | 20 | 50 | 38 | 30 | 60 | 30 | 4 | 60 | 20 |
| Thermal Deformation Temperature (°C.) | 79 | 81 | 70 | 72 | 60 | 58 | 76 | 75 | 58 | 79 |
| Thermal Sagging (mm) | 2.1 | 2.1 | 5.5 | 5.5 | 5.8 | 7.9 | 2.4 | 2.9 | 6.5 | 1.9 |
| Solvent Absorption (weight %) | 0.91 | 0.93 | 1.20 | 1.21 | 1.35 | 2.10 | 0.58 | 0.60 | 1.05 | 0.39 |
| Linear Expansion Coefficient ($\times 10^{-5}$ cm/cm/°C.) | 6.5 | 6.0 | 7.9 | 7.6 | 6.8 | 5.8 | 7.2 | 7.0 | 4.8 | 8.2 |
| Paintability | O | O | O | O | O | Δ | O | O | O | O |
| Surface Appearance | X | X | O | O | X | X | Δ | O | X | Δ |
| Surface Gloss | 63 | 55 | 70 | 70 | 65 | 75 | 73 | 78 | 72 | 66 |

Note
*The amount of talc is expressed by weight % based on 100 weight % of the resin component.

As is clear from Tables 1 and 2, the resin compositions for bumpers according to the present invention have not only high Izod impact strength, flexural modulus and MFR but also suffer from less solvent absorption and are excellent in surface gloss and surface appearance. On the other hand, the resin compositions of Comparative Examples are disadvantageous in at least one of flexural modulus, solvent absorption and surface appearance.

As described above in detail, the resin composition for bumpers according to the present invention can provide the bumpers with excellent flexural modulus, Izod impact strength, solvent absorption, paintability, surface appearance, surface gloss, etc., since it contains two or more propylene-ethylene block copolymers having different MFRs, an ethylene-propylene copolymer rubber and/or an ethylene-propylene-diene terpolymer rubber, and a high-density polyethylene in particular proportions.

What is claimed is:
1. A resin composition for bumpers comprising:
   (a) 50–65 parts by weight of a propylene-ethylene block copolymer comprising:

(i) 60–75 weight % of a propylene-ethylene block copolymer having an ethylene content of 4–20 weight % and a melt flow rate of 9–30 g/10 min (230° C., 2.16 kg load), and
(ii) 40–25 weight % of a propylene-ethylene block copolymer having an ethylene content of 4–20 weight % and a melt flow rate of 40–80 g/10 min (230° C., 2.16 kg load);

(b) 40–25 parts by weight of an ethylene-propylene copolymer rubber and/or an ethylene-propylene-diene terpolymer rubber each having an ethylene content of 50–80 weight % and a Mooney viscosity $ML_{1+4}$ (100° C.) of 80 or less; and (c) 10–15 parts by weight of high-density polyethylene having a melt index of 1–20 g/10 min (190° C., 2.16 kg load), (a)+(b)+(c) being 100 parts by weight.

* * * * *